Feb. 10, 1931.  E. KEENEY  1,792,463
LID AND CAN TONGS.
Filed March 10, 1927
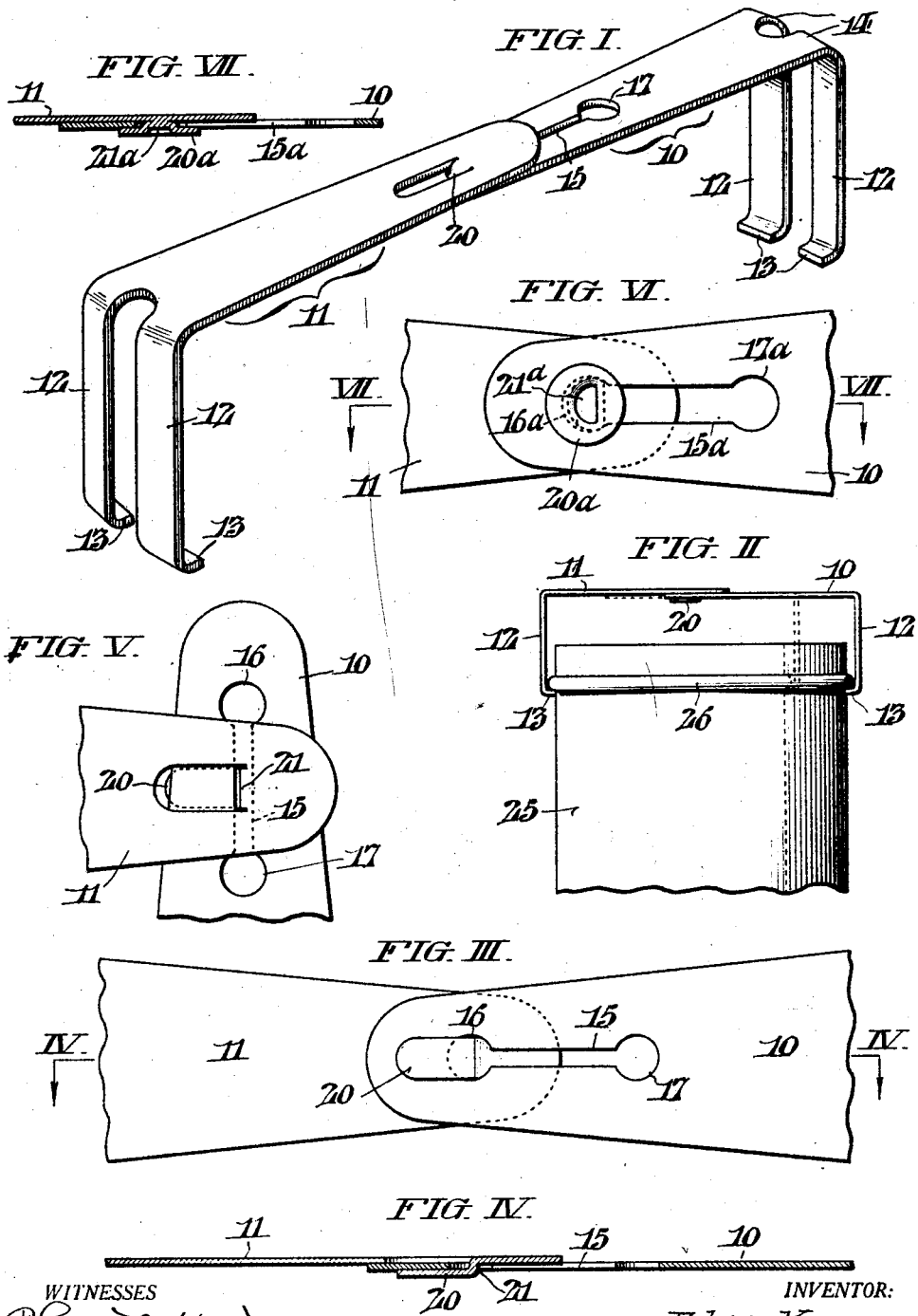

Patented Feb. 10, 1931

1,792,463

UNITED STATES PATENT OFFICE

EDGAR KEENEY, OF PHILADELPHIA, PENNSYLVANIA, ASSIGNOR TO NICETOWN MANUFACTURING COMPANY, OF PHILADELPHIA, PENNSYLVANIA, A CORPORATION OF PENNSYLVANIA

LID AND CAN TONGS

Application filed March 10, 1927. Serial No. 174,154.

The present invention relates to lid and can tongs and the like, and is especially adaptable and advantageous for dealing with round lids, cans, or other such objects, particularly ice cream cans and their lids. In suitable forms of embodiment, such as hereinafter illustrated, the invention affords a convenient and effective means for carrying ice cream cans and for pulling off their lids; it is adjustable and adaptable to cans and lids of a wide variety of sizes; while it is simple, strong, rugged, and inexpensive to manufacture.

How this and other advantages can be realized from the invention will appear from the description hereinafter of selected and preferred embodiments.

In the drawings, Fig. I is a perspective view of one form of device conveniently embodying the invention.

Fig. II is a fragmentary side elevation, on a smaller scale, illustrating the application of the device to an ice cream can or the like.

Fig. III is a fragmentary inverted plan view of the central portion of the device, illustrating the interconnection of its parts.

Fig. IV shows a longitudinal section through the parts shown in Fig. III, taken as indicated by the line IV—IV in that figure.

Fig. V is a fragmentary view of the parts and their interconnection, illustrating a step in their adjustment or adaptation to cans of different sizes.

Fig. VI is a view similar to Fig. III, illustrating a somewhat different construction.

Fig. VII is a view similar to Fig. IV, sectionally illustrating the construction of Fig. VI.

As shown in Figs. I to V, the device comprises a couple of interconnected parts or members 10, 11 having grapple portions 12, 12 extending below them with carrying hooks 13, 13 for engaging the object to be dealt with. As the particular device here illustrated is intended for gripping objects externally rather than internally, the hooks 13, 13 are turned inward. As shown in Fig. I, each of the members 10, 11 has a set or plurality of hooks 13, 13, separated somewhat from one another. In order to still better adapt the device for engaging effectively with objects of different sizes and contours, the hooks 13, 13 of each set may be elastically or resiliently yielding. In the present instance, the end 12 of each member 10, 11 is divided or in multiple, as well as its engaging hooks 13, 13, and the longitudinal division extends all the way up to the horizontal body of such member and even around the bend 14 into such horizontal body. By making the members 10, 11 (or their portions 12, 12) of somewhat springy, elastic sheet metal, of suitable gage, the grapple hooks 13, 13 can be rendered so resiliently yielding and movable relative to one another as to be in a high degree self-adjusting to the contours with which they may have to engage. Also, the members 10, 11 can be very easily and cheaply manufactured out of sheet metal, by simply cutting them to outline in suitable dies and then bending their ends downward and inward as at 14, 13. For use with commercial ice cream cans (such as commonly employed for delivering ice cream to soda fountains), a springy sheet steel about $\frac{1}{16}$ inch in thickness is very suitable.

In order to adapt the device to objects of various sizes, provision is made for varying the distance apart of the sets of grapple hooks 13, 13 by relative adjustment of the members 10, 11 across the direction of effective pull of the device, or in the plane of the main horizontal portions of said members. In the present instance, the interconnection of the members 10, 11 permits of both angular and longitudinal adjustment or variation in relative positions, and either or both of these adjustments may be made use of for adjusting the effective distances between the sets of grapple hooks 13, 13. As shown in Figs. I, III, IV and V, the member 10 has an opening comprising a longitudinal slot 15 locally enlarged at separated points (in the present instance, at the ends only) into round holes 16, 17; while the member 11 has a laterally projecting "headed" connector 20 extending through the opening formed by the slot 15 and the holes 16, 17, and overhanging the sides of the opening at the other side of said member 10, so as to lock the parts together with some degree of looseness or play. As shown in Figs. I, II, IV and V, the connector 20 consists of a tongue punched out of the member 11 near one end, bent downward through the opening in the member 10, and then bent over parallel with the body of the member 11 again. The width of the downward extending shank or root portion 21 of this tongue 20 is slightly less than the diameter of either of the openings 16, 17, so as to permit it to turn freely in said openings; while the width of the slot 15 is slightly greater than the thickness of the portion 21, so as to permit said latter to be shifted freely through the slot, as shown in Fig. V, though not to be turned therein very far. Thus a slight relative turning of the members 10, 11, with the connector 20 in either hole 16 or 17, locks said members as against relative longitudinal displacement.

With this construction, and the connector 20 engaged in the opening 16, say, as shown in Figs. I, III, and IV, the parts 10, 11 can be swung about the connector 20 as a pivot into an angular position with reference to one another so as to permit their hooks 13, 13 to be placed against the periphery of an ice cream can 25 beneath its bead 26, some 120° apart, more or less. Thereupon, the members 10, 11 can be swung more and more nearly into line with one another and their hooks 13, 13 further and further apart, always against the periphery of the can 25 below its bead 26, until said hooks are substantially diametrically opposite one another. The device being thus engaged, the can 25 may be lifted by it as a handle or "bail", the pull on the hooks 13, 13 increasing the friction between the members 10, 11 and thus preventing accidental dislocation of said members and disengagement of the device. The freedom of the grapple hooks 13, 13 of each set to move and yield resiliently relative to one another allows both of them to engage effectively with each side of the can 25, notwithstanding a considerable degree of angularity between the members 10, 11, as already explained. As the limit of size of the object grasped is reached the members 10, 11, come into substantial or absolute alignment.

By engaging the hooks 13, 13 beneath the edge of a can lid (not shown), instead of under the can bead 26 as in Fig. II, the device may be used to pull such lid off the can.

When smaller cans are to be dealt with, the connector 20 may be shifted through the slot 15, as shown in Fig. V, into the opening 17, and the device thereafter manipulated in the same way. With suitable relative locations of the openings 16, 17, this adjustment and the above-described angular adjustment of the members 10, 11 will take care of practically all sizes of cans within the maximum capacity of the device.

In the construction illustrated in Figs. VI and VII, the connector 20a consists of a sheet metal disc with a semi-circular embossment 21a corresponding in diameter to the holes 16a, 17a, and in its other dimension or "width" to the slot 15a, said slot being here shown as somewhat wider than that in Figs. I–V. The shank formed by the embossment 21a lies in the opening formed by the slot 15a and holes 16a, 17a, and its end is secured to the other member 11 in any suitable manner, as by spot welding. The outer portion of the disc around the shank embossment 21a forms a very effective head. The operation of the device thus constructed is the same as for the other construction.

Having thus described my invention, I claim:

1. A device of the character described comprising relatively adjustable components occupying a common plane and co-ordinated by a pivotal connection, said connection permitting shifting of the components, only when swung into angular relation, to adapt the device to objects of different size.

2. A device of the character described comprising relatively movable components with portions occupying a common plane and co-ordinated by a pivot connection, said connection accommodating extension or contraction of the components to different pivotal location, only when swung into substantially right-angled relation, to adapt the device to objects of different size.

3. A device of the character described comprising grapple members adapted to extend across a lid and engage under opposite sides thereof to lift the same, and interconnected so as to be angularly movable with reference to one another in a plane across their direction of lifting pull, said members being co-ordinated by a connector on the one engaging local enlargements in a slot of the other to thereby interlock the same in different longitudinal relations, so as to be adaptable to objects of different sizes.

4. A device of the character described comprising grapple members adapted to extend across a lid and engage under opposite sides thereof to lift the same, and interconnected so as to be swingable relative to one another, in a plane across their direction of lifting pull, said members being co-ordinated by a headed connector on the one engaging local enlargements in a slot of the other to thereby pivotally interlock the same in different longitudinal positions with reference to one another, and thus adapt the device to objects of various different sizes.

5. A device of the character described comprising grapple members adapted to extend across a lid and engage under opposite sides thereof to lift the same, and interconnected so as to be swingable relative to one another in a plane across their direction of lifting pull, said members being co-ordinated by a connector portion of the one engaging any one of a plurality of local enlargements in a slot of the other to thereby pivotally interlock the same so as to be adaptable to objects of different sizes, each of said members having multiple engaging hooks resiliently movable relative to one another, so as to engage such objects of different sizes more effectively when said members are in angular relations to one another.

6. A device of the character described comprising overlapping grapple members adapted to engage under opposite sides of a lid and lift the same, with means of interconnection permitting shifting of said members lengthwise relative to one another, said means comprising a headed connector on the one member engageable in any one of a series of local enlargements of a slot afforded in the other member, said connection also permitting the grapple members to pivot and swing about in a plane across their direction of lifting pull.

7. A device of the character described comprising overlapping grapple members adapted to engage under opposite sides of a lid and lift the same, and interconnected so as to be swingable relative to one another in a plane across the direction of lifting pull, one of said members having a longitudinal slot with local enlargements, and the other a connector engaged and shiftable in said slot, but freely turnable only in its said enlargements.

8. A device of the character described comprising overlapping members of springy sheet metal with their ends bent downward and inward, and longitudinally divided, thus affording sets of resiliently self-adjusting grapple hooks; one of said members having a longitudinal slot with local enlargements, and the other having a headed connector with its shank engaged and shiftable in said slot, but freely turnable only in its said enlargements.

In testimony whereof, I have hereunto signed my name at Philadelphia, Pennsylvania, this 4th day of March, 1927.

EDGAR KEENEY.